US006716921B1

(12) United States Patent
Nakashima et al.

(10) Patent No.: US 6,716,921 B1
(45) Date of Patent: Apr. 6, 2004

(54) PROPYLENE RESIN COMPOSITION

(75) Inventors: Takanori Nakashima, Chiba (JP); Shinichi Akitaya, Chiba (JP); Yuya Ishimoto, Chiba (JP); Yasuhiro Mochizuki, Chiba (JP); Yoshitaka Morimoto, Kanagawa (JP); Yoshitaka Sumi, Oita (JP)

(73) Assignee: Chisso Corporation, Osaka (JP)

( * ) Notice: Subject to any disclaimer, the term of this patent is extended or adjusted under 35 U.S.C. 154(b) by 22 days.

(21) Appl. No.: 10/070,354

(22) PCT Filed: Sep. 5, 2000

(86) PCT No.: PCT/JP00/06008

§ 371 (c)(1),
(2), (4) Date: Mar. 6, 2002

(87) PCT Pub. No.: WO01/18110

PCT Pub. Date: Mar. 15, 2001

(30) Foreign Application Priority Data

Sep. 7, 1999 (JP) ............................................. 11-252936

(51) Int. Cl.$^7$ ...................... C08L 23/00; C08L 23/04; C08F 8/00
(52) U.S. Cl. ...................................... 525/191; 525/240
(58) Field of Search ................................ 525/191, 240

(56) References Cited

U.S. PATENT DOCUMENTS

| 4,016,118 A | 4/1977 | Hamada et al. |
| 4,140,732 A | 2/1979 | Schnetger et al. |
| 4,252,914 A | 2/1981 | Halasa et al. |
| 4,267,080 A | 5/1981 | Yokoyama et al. |
| 4,410,649 A | 10/1983 | Cieloszyk |
| 4,459,385 A | 7/1984 | McCullough, Jr. |
| 4,508,872 A | 4/1985 | McCullough, Jr. |

(List continued on next page.)

FOREIGN PATENT DOCUMENTS

| EP | 0 225 693 | 6/1987 |
| EP | 0 270 764 | 6/1988 |
| EP | 0 276 323 | 8/1988 |
| EP | 0 457455 | 11/1991 |
| EP | 0 538 749 | 4/1993 |
| EP | 0 700 943 | 3/1996 |
| EP | 0 726 292 | 8/1996 |
| EP | 0 739 941 | 10/1996 |
| EP | 0 751 160 | 1/1997 |
| EP | 0 790 262 | 8/1997 |
| EP | 0 863 183 | 9/1998 |
| EP | 0 885 926 | 12/1998 |
| GB | 2 309 973 | 8/1997 |
| JP | 56-072042 | 6/1981 |
| JP | 57-063350 | 4/1982 |
| JP | 63-102634 | 5/1988 |
| JP | 63-112612 | 5/1988 |
| JP | 1-171434 | 7/1989 |
| JP | 2-258854 | 10/1990 |
| JP | 3-6251 | 1/1991 |
| JP | 3-205439 | 9/1991 |
| JP | 4-97843 | 3/1992 |
| JP | 4-114045 | 4/1992 |
| JP | 4-114050 | 4/1992 |
| JP | 4-296530 | 10/1992 |
| JP | 5-38792 | 2/1993 |
| JP | 5-117342 | 5/1993 |
| JP | 5-168398 | 7/1993 |
| JP | 5-331327 A | 12/1993 |
| JP | 6-93061 | 4/1994 |
| JP | 6-145268 | 5/1994 |
| JP | 6-211996 | 8/1994 |
| JP | 6-239918 | 8/1994 |
| JP | 7-17043 | 3/1995 |
| JP | 7-102126 | 4/1995 |
| JP | 7-118429 | 5/1995 |
| JP | 7-241906 | 9/1995 |
| JP | 8-27238 | 1/1996 |
| JP | 8-34103 | 2/1996 |
| JP | 8-41278 | 2/1996 |
| JP | 8-41279 | 2/1996 |
| JP | 8-59766 | 3/1996 |
| JP | 8-67783 | 3/1996 |
| JP | 8-104792 | 4/1996 |
| JP | 8-217930 | 8/1996 |
| JP | 8-239547 | 9/1996 |
| JP | 9-77953 | 3/1997 |
| JP | 9-169050 | 6/1997 |
| JP | 10-53628 | 2/1998 |
| JP | 10-087744 | 4/1998 |
| JP | 10-316727 | 12/1998 |
| JP | 10-316810 | 12/1998 |
| WO | 8-119292 | 5/1996 |
| WO | 8-34103 | 6/1996 |
| WO | WO97/19135 | 5/1997 |
| WO | WO98/54257 | 12/1998 |
| WO | WO 98/54258 | 12/1998 |

OTHER PUBLICATIONS

U.S. patent application Ser. No. 09/674,701, Akitaya et al., filed Nov. 2000.
U.S. patent application Ser. No. 09/670,273, Ando et al., filed Sep. 2000.
U.S. patent application Ser. No. 09/615,740, Horikoshi et al., filed Jul. 2000.
U.S. patent application Ser. No. 09/485,492, Ushioda et al., filed Feb. 2000.

Primary Examiner—Nathan M. Nutter
(74) Attorney, Agent, or Firm—Leydig, Voit & Mayer, Ltd.

(57) ABSTRACT

A propylene resin composition is constructed so as to contain (A) a propylene-α-olefin random copolymer with the content of a propylene unit of 99.1 to 99.9% by weight, and (B) a propylene-α-olefin random copolymer with the content of a propylene unit of 70 to 90% by weight, in the specified proportion, and to have the specified loss tangent (tan δ) and storage elastic modulus (E'), in the temperature dependence of dynamic viscoelasticity. Thereby, the propylene resin composition is provided, suitable as a raw material for shaped article having a well-balanced combination of transparency, stress-whitening resistance; impact resistance at low temperatures, and further heat resistance.

3 Claims, 3 Drawing Sheets

U.S. PATENT DOCUMENTS

| | | |
|---|---|---|
| 4,532,280 A | 7/1985 | Kobayashi et al. |
| 4,619,859 A | 10/1986 | Yoshimura et al. |
| 4,889,888 A | 12/1989 | Bassi et al. |
| 4,954,291 A | 9/1990 | Kobayashi et al. |
| 5,023,300 A | 6/1991 | Huff et al. |
| 5,049,605 A | 9/1991 | Rekers |
| 5,073,598 A | 12/1991 | Anzini |
| 5,134,174 A | 7/1992 | Xu et al. |
| 5,230,934 A | 7/1993 | Sakano et al. |
| 5,232,993 A | 8/1993 | Winter et al. |
| 5,254,393 A | 10/1993 | Murschall et al. |
| 5,298,561 A | 3/1994 | Cecchin et al. |
| 5,302,454 A | 4/1994 | Cecchin et al. |
| 5,470,898 A | 11/1995 | Syed |
| 5,504,171 A | 4/1996 | Etherton et al. |
| 5,516,848 A | 5/1996 | Canich et al. |
| 5,539,056 A | 7/1996 | Yang et al. |
| 5,556,821 A | 9/1996 | Aida et al. |
| 5,654,372 A | 8/1997 | Sadatoshi et al. |
| 5,744,205 A | 4/1998 | Kawai et al. |
| 5,756,609 A | 5/1998 | Cohen |
| 5,777,055 A | 7/1998 | Peiffer et al. |
| 5,856,400 A | 1/1999 | Matsumura et al. |
| 5,891,235 A | 4/1999 | Suzuki et al. |
| 5,962,595 A | 10/1999 | Dolle et al. |
| 6,005,034 A | 12/1999 | Hayashida et al. |
| 6,107,388 A | 8/2000 | Sanpei et al. |
| 6,110,549 A | 8/2000 | Hamada et al. |
| 6,184,402 B1 | 2/2001 | Yamazaki et al. |
| 6,201,069 B1 | 3/2001 | Fukazawa et al. |
| 6,294,632 B1 | 9/2001 | Shiraishi et al. |
| 6,300,415 B1 * | 10/2001 | Okayama et al. ............ 525/191 |
| 6,303,698 B1 | 10/2001 | Ushioda et al. |
| 6,319,991 B1 * | 11/2001 | Okayama et al. ............ 525/240 |
| 6,326,432 B1 | 12/2001 | Fujita et al. |
| 6,395,071 B1 | 5/2002 | Niijima et al. |

* cited by examiner

PROPYLENE RESIN COMPOSITION

TECHNICAL FIELD

This invention relates to propylene resin compositions, and more particularly to propylene resin compositions having a well-balanced combination of transparency, stress-whitening resistance and impact resistance at low temperatures, and further having good heat resistance.

BACKGROUND ART

Polypropylene resins have been used in a wide variety of fields, because or their relatively low cost and excellent thermal and mechanical characteristics. In general, however, propylene homopolymers have high stiffness, but poor impact resistance, especially at low temperatures. To improve the impact resistance at low temperatures of propylene homopolymers, a propylene block copolymer composition comprising a propylene homopolymer component as initially produced and an ethylene-propylene random copolymer component as subsequently produced has been extensively employed in various industrial fields including automobiles and household appliances.

These conventional propylene block copolymer compositions are excellent in impact resistance, but inferior in transparency as compared with homopolymers, and have large whitening when subjected to impact. As a method to improve the disadvantage of whitening when subjected to impact in the propylene block copolymer composition, there have been proposed a method of increasing the ethylene content in the copolymer and a method of adding polyethylene to the propylene block copolymer composition. Both methods are excellent in improving impact resistance, but have a problem, i.e, they reduce the transparency of the product.

JP-A-5-331327 discloses a polymer composition comprising a propylene block copolymer composition with a specified ratio of the intrinsic viscosity of a propylene homopolymer component to that of an ethylene propylene random copolymer component. JP-A-6-145268 discloses a polymer composition with a specified intrinsic viscosity of a propylene homopolymer component, a specified ratio of the intrinsic viscosity of a propylene homopolymer component to that of an ethylene propylene copolymer component and a specified ethylene content in the ethylene propylene random copolymer component. JP-A-56-72042 and JP-A-57-63350 disclose a polyolefin resin composition wherein an ethylene-propylene copolymer containing a small amount of ethylene is blended with another ethylene-propylene copolymer. JP-A-10-87744 discloses a propylene resin composition wherein a small amount of ethylene is incorporated in a propylene homopolymer component in the ethylene-propylene block copolymer.

DISCLOSURE OF THE INVENTION

Shaped articles made from these polymer compositions have been more improved than conventional propylene block copolymer compositions in respect of the stress-whitening resistance and transparency, but additional improvements have been required.

An object of the invention is to provide a propylene resin composition having a well-balanced combination of transparency, stress-whitening resistance and impact resistance at low temperatures and further heat resistance characteristics.

As a result of earnest investigations to attain the above-described objects, we have found that a propylene resin composition wherein (A) a propylene-α-olefin random copolymer containing a specified amount of α-olefin unit and (B) a propylene-α-olefin random copolymer having the content of α-olefin unit different from the random copolymer (A) are composed in a specified composition has a well-balanced combination of transparency, stress-whitening resistance and impact resistance at low temperatures, and further good heat resistance characteristics. The temperature dependence of dynamic viscoelasticity of the resin composition is such that, the loss tangent (tan δ) and the storage elastic modulus (E') meet certain conditions. The present invention was thus completed.

Thus the present invention relates to a propylene resin composition comprising 80 to 40% by weight, based on the weight of the composition, of (A) a propylene-α-olefin random copolymer with the content of a propylene unit of 99.1 to 99.9% by weight, and 20 to 60% by weight, based on the weight of the composition, of (B) a propylene-α-olefin random copolymer with the content of a propylene unit of 70 to 90% by weight, and the temperature dependence of dynamic viscoelasticity of the composition is such that the composition shows only one peak of loss tangent (tan δ) in the temperature range of −80° C. to 80° C., and the temperature at which the storage elastic modulus (E') is $1 \times 10^8$ dyn/cm$^2$ or less is not less than 150° C.

BEST MODE FOR CARRYING OUT THE INVENTION

Figure 1:
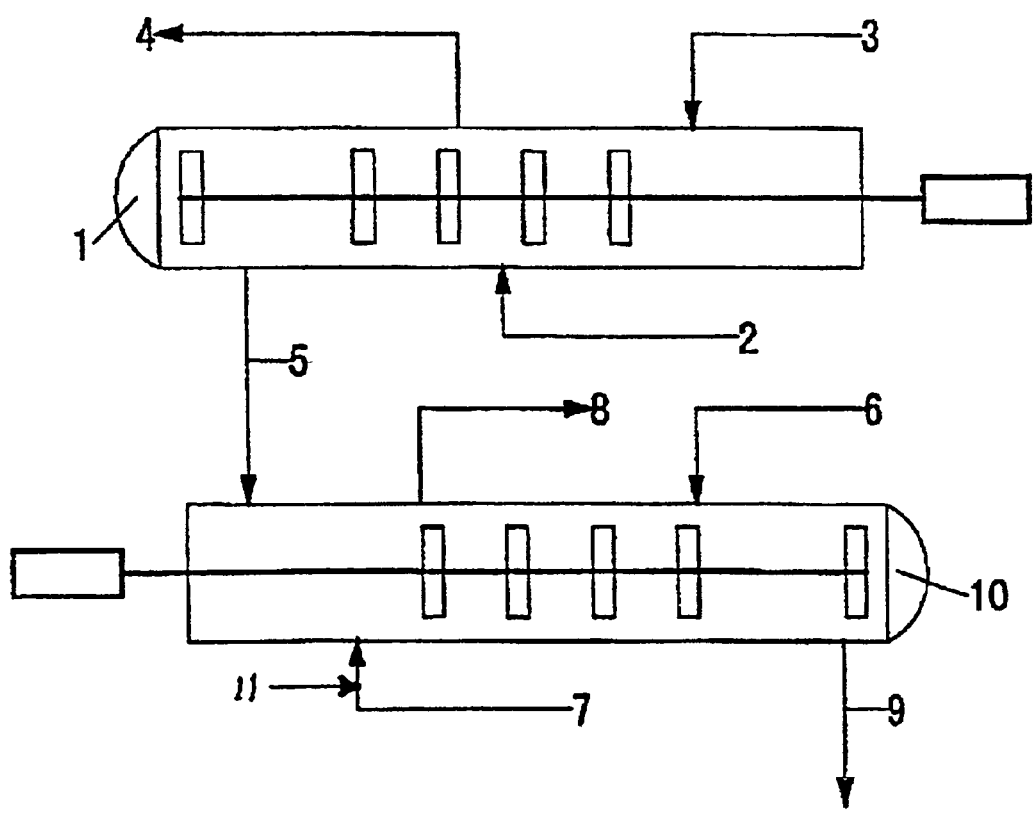
FIG. 1 is a flow sheet showing a continuous polymerization apparatus used in the Examples and Comparative Examples. In the reference numbers used in FIG. 1 and 10 refer to a polymerization reactor, 2 and 7 refer to a hydrogen piping, 3 and 6 refer to a raw material mixing gas piping, 4 and 8 refer to an unreacted gas piping, 5 and 9 refer to a polymer removal piping, and 11 refers to an active inhibitor addition piping.

In the propylene resin composition, the propylene-α-olefin random copolymer (A) contains 99.1–99.9% by weight of a propylene unit and 0.9–0.1% by weight of an α-olefin unit other than propylene.

If the content of a propylene unit in the copolymer (A) is too low, shaped articles made from such propylene resin composition have lower heat resistance characteristics. If the content of the propylene unit is too high, the stress-whitening resistance and transparency of the shaped articles become insufficient. It is particularly preferred that the propylene-α-olefin random copolymer (A) constituting the propylene resin composition of the present invention contains 99.5–99.9% by weight of a propylene unit and 0.5–0.1% by weight of an α-olefin unit other than propylene.

α-olefins constituting the α-olefin unit contained in the propylene-α-olefin random copolymer (A) can include ethylene, 1-butene, 1-pentene, 1-hexene, 1-octene, 1-decene, 1-dodecene, 4-methyl-1-pentene and 3-methyl-1-pentene. One or more olefins may be used. Ethylene and 1-butene are preferable from a viewpoint of manufacturing cost.

In the propylene resin composition of the present invention, the propylene-α-olefin random copolymer (B) contains 70–90% by weight of a propylene unit and 30–10% by weight of an α-olefin unit other than propylene. If the content of propylene unit in the copolymer (B) is too high, shaped articles made from such composition become insufficient in impact resistance at low temperatures. If the propylene unit content is too low, shaped articles have a lower transparency. The propylene-α-olefin random copolymer (B) constituting the propylene resin composition of the present invention contains preferably 70–85% by weight of a propylene unit and 30–15% by weight of an α-olefin unit other than propylene, most preferably 75–85% by weight of a propylene unit and 25–15% by weight of an α-olefin unit other than propylene.

α-Olefins constituting the α-olefin unit contained in the propylene-α-olefin random copolymer (B) can include the same compounds as α-olefins contained in the copolymer (A). Ethylene and 1-butene are preferable.

The propylene resin composition of the present invention comprises 80 to 40% by weight, based on the weight of the composition, of (A) a propylene-α-olefin random copolymer and 20 to 60% by weight, based on the weight of the composition, of (B) a propylene-α-olefin random copolymer. If the content of the copolymer (A) is too high, the impact resistance at low temperatures becomes insufficient. If the content of the copolymer (A) is too low, the stiffness lowers remarkably.

It is particularly preferred that the propylene resin composition of the present invention comprises 80 to 50% by weight of (A) a propylene-α-olefin random copolymer and 20 to 50% by weight of (B) a propylene-α-olefin random copolymer.

The propylene resin composition of the present invention has a temperature dependence of dynamic viscoelasticity such that it shows only one peak of loss tangent (tan δ) in the temperature range of −80° C. to 80° C. When the propylene resin composition has two or more peaks of loss tangent in such temperature range, it shows that the compatibility of each component constituting such composition is not sufficient. Shaped articles produced using this component do not exhibit such transparency and stress-whitening resistance as desired in the present invention.

When two different components exist together, plural peaks of loss tangent will appear. As the compatibility of each component increases, the plural peaks will converge gradually into a single peak. However, it is considered that the composition of the present invention comprising (A) a propylene-α-olefin copolymer and (B) a propylene-α-olefin copolymer with different contents of propylene unit from each other can achieve the effect desired in the present invention by constituting the peak of loss tangent so as to have only one peak in the above temperature range. The advantage of the invention is such that much of the characteristics which each component brings individually are maintained while a strong characteristic (loss tangent) is united into a single peak.

In addition, the propylene resin composition of the present invention has a temperature dependence of dynamic viscoelasticity such that the temperature at which the storage elastic modulus (E') lowers to $1 \times 10^8$ dyn/cm$^2$ or less is 150° C. or more, although the storage elastic modulus, which is an index of dynamic viscoelasticity, lowers with the temperature rise.

When the temperature is less than 150° C., shaped articles made from such composition does not exhibit desired heat resistance characteristics. When the temperature is 155° C. or more, shaped articles made from such propylene resin composition have more preferable heat resistance characteristics.

The storage elastic modulus of the propylene resin composition lowers rapidly, when the temperature of the composition rises up more than above a certain temperature. On the other hand, lowering of storage elastic modulus of the composition, i.e., change of dynamic viscoelastic performance, is gentle in the temperature range where the storage elastic modulus exceeds $1 \times 10^8$ dyn/cm$^2$. Lowering of storage elastic modulus (E') to $1 \times 10^8$ dyn/cm$^2$ or less signifies a fatal loss in the dynamic viscoelastic performance. The significant aspect of the invention that the temperature at which the storage elastic modulus (E') lowers to $1 \times 10^8$ dyn/cm$^2$ or less is not less than 150° C. signifies that lowering in the performance of dynamic viscoelasticity with the temperature rise can be maintained as a gentle lowering. That is, it shows a heat resistant performance in the dynamic viscoelasticity.

The propylene resin composition of the present invention can be produced suitably, when the intrinsic viscosity (hereafter referred to as $[\eta]_B$) as determined in tetralin at 135° C. for the propylene-α-olefin random copolymer (B) constituting the composition is in the range of 0.5 to 2.0 dl/g, particularly 1.0 to 2.0 dl/g, more preferably 1.3 to 2.0 dl/g.

Since the intrinsic viscosity $[\eta]_B$ of the propylene-α-olefin random copolymer (B) cannot be directly measured, it is calculated from the intrinsic viscosity (hereafter referred to as $[\eta]_A$) of the propylene-α-olefin random copolymer (A) and the intrinsic viscosity (hereafter referred to as $[\eta]_{WHOLE}$) of the propylene resin composition as a final product which can be directly measured, and the weight % (hereafter referred to as $W_B$) of the propylene-α-olefin random copolymer (B), in accordance with the following equation.

$$[\eta]_B = \{[\eta]_{WHOLE} - (1 - W_B/100)\,[\eta]_A\}/(W_B/100)$$

The propylene resin composition of the present invention can be used suitably as a raw material for the production of shaped articles which are excellent in transparency, stress-whitening resistance, impact resistance at low temperatures and have further heat resistance characteristics.

The propylene resin composition of the present invention may be produced by any suitable method, but it can be suitably produced by a two-stage continuous polymerization process in a vapor phase.

The two-stage continuous polymerization process comprises continuously conducting the first polymerization step wherein propylene and other α-olefins than propylene are copolymerized preferably in a vapor phase in the presence of a catalyst containing a catalyst component for polyolefin manufacture to produce a prescribed amount of the propylene-α-olefin random copolymer (A) having the specified composition ratio, and successively conducting the second polymerization step wherein propylene and other α-olefins than propylene are copolymerized by varying the composition ratio to produce a prescribed amount of the remaining propylene-α-olefin random copolymer (B).

The catalyst used in the above-mentioned process is not limited to a particular catalyst. A variety of catalyst components such as titanium and metallocene type catalyst components can be used to produce the composition.

As the catalyst components for polyolefin manufacture, those with an average particle size of 30–300 μm, preferably 30–150 μm are used. If the average particle size of the catalyst component for polyolefin manufacture is too small, the powder flowability of the resultant propylene resin powder composition is impaired remarkably; this tends to contaminate the polymerization system by adhesion of the powder to the polymerization reactor wall and the agitator blade, and also creates a difficulty in conveying the powder discharged from the polymerization reactor. This leads to a hindrance to stable production.

Preferably, the catalyst component for polyolefin manufacture has a particle size distribution with not more than 3.0 of the degree of uniformity. If the degree of uniformity is larger, the flowability of the propylene resin powder composition will worsen, with the difficulty in continuously stable production.

A stereoregular catalyst comprising the above-described catalyst component for polyolefin manufacture, an organoaluminum compound, optionally in combination with an organosilicon compound is used in the copolymerization of propylene and other α-olefins than propylene in the first polymerization step. Preferably, the catalyst is used after preactivation by reacting the catalyst component for polyolefin manufacture with small amounts of α-olefins.

Preactivation of the catalyst component for polyolefin manufacture can be performed in the presence or absence of similar organoaluminum compound to that used in the polymerization. In case where the transition metal in the catalyst component for polyolefin manufacture is titanium, the organoaluminum compound used in the preactivation is used usually in the range of 0.1–40 mols, preferably 0.3–20 mols per mol of titanium atom, depending on the type of the catalyst component used for polyolefin manufacture. 0.1–100 grams, preferably 0.5–50 grams of α-olefins per gram of the catalyst component for polyolefin manufacture is reacted in an inert solvent using such catalyst at 10–80° C. over a period of 10 minutes to 48 hours.

In the preactivation, an organosilicon compound similar to that used in the polymerization may be used if necessary, in the range of 0.01–10 moles per mol of the organoaluminum compound.

α-Olefins used in the preactivation of the catalyst component for polyolefin manufacture include ethylene, propylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, 3-methyl-1-pentene and the like. These may be alone or a mixture of two or more compounds.

To control the molecular weight of the polymer produced during the polymerization, a molecular weight modifier such as hydrogen can be used together.

Inert solvents used in the preactivation of the catalyst component for polyolefin manufacture are those not affecting the polymerization reaction remarkably, which include liquid saturated hydrocarbons such as hexane, heptane, octane, decane, dodecane and liquid paraffin, and silicon oils having dimethylpolysiloxane structure. These inert solvents may be either a single solvent of one solvent or a mixed solvent of two or more solvents.

The inert solvents are preferably used after removal of impurities such as moisture and sulfur compound, which have a bad influence on the polymerization.

The propylene resin composition of the present invention is produced suitably by continuously conducting the first polymerization step wherein propylene and other α-olefins than propylene are copolymerized in a vapor phase in the presence of a catalyst containing a catalyst component for polyolefin manufacture which has been preactivated in the above process, and successively conducting the second polymerization step wherein propylene and α-olefins are copolymerized by varying the ratio of propylene used in the first polymerization step.

The first polymerization step, without limitation to a vapor phase polymerization, can employ a slurry polymerization and a bulk polymerization. The successive second polymerization step is preferably a vapor phase polymerization, and so preferably the first polymerization step may also employ a vapor phase polymerization. In case where slurry and bulk polymerizations are employed as the second polymerization step, the copolymer needs to be dissolved out in a solvent, which tends to make continuation of stable operation difficult.

For the polymerization conditions of the propylene-α-olefin random copolymer (A), propylene and other α-olefins than propylene are supplied under the conditions including a polymerization temperature of 20–120° C., preferably 40–100° C., a polymerization pressure of ambient pressure to 9.9 MPa, preferably 0.59–5.0 MPa, in the presence of a stereoregular catalyst comprising the catalyst component for polyolefin manufacture, an organoaluminum component and optionally an organosilicon compound, while mixing and stirring prescribed amount of powders, thereby carrying out the polymerization of the propylene-α-olefin random copolymer (A). The use ratio (molar ratio) of the organoaluminum compound to the catalyst component for polyolefin manufacture is Al/Ti=1–500, preferably 10–300 for the titanium catalyst component used, depending on the type of catalyst component used for polyolefin manufacture. In this case, a mol number of the titanium catalyst component refers to a gram atom of substantial Ti present in the titanium catalyst component. The use ratio (molar ratio) of the organosilicon compound optionally used to the organoaluminum compound is Al/Si=1–20 for the titanium catalyst component used, depending on the type of catalyst component used for polyolefin manufacture.

The propylene-α-olefin random copolymer (A) is produced so that the content of a propylene unit is 99.1 to 99.9% by weight and 80–40% by weight of the propylene-α-olefin random copolymer (A) is contained in the composition.

The composition of the present invention is suitably obtained when the intrinsic viscosity $[\eta]_B$ of the propylene-α-olefin random copolymer (B) is 0.5 to 2.0 dl/g. Preferably, the present composition is further characterized in that the intrinsic viscosity of the propylene-α-olefin random copolymer (A) is in the range of 0.5 to 4.0 dl/g and the resultant composition meets the requirements for "storage elastic modulus" and "loss tangent" in the present invention.

The intrinsic viscosity can be controlled by using a molecular weight modifier such as hydrogen at the time of polymerization. After the polymerization of the propylene-α-olefin random copolymer (A), part of the produced powder is taken out and the intrinsic viscosity $[\eta]_A$ is measured.

Subsequent to the polymerization of the propylene-α-olefin random copolymer (A), the second polymerization step can be conducted wherein propylene and other α-olefins than propylene are copolymerized by varying the composition ratio of the mixed monomer in the first polymerization step, under the conditions including a polymerization temperature of 20–120° C., preferably 40–100° C., a polymerization pressure of ambient pressure to 9.9 MPa, preferably 0.59–5.0 MPa, to produce the propylene-α-olefin random copolymer (B). The propylene-α-olefin random copolymer (B) is adjusted so that the content of α-olefin unit in the copolymer is from 30 to 10% by weight, by controlling a gas molar ratio of α-olefin nonomer and propylene monomer in the comonomer gas used.

The weight of the propylene-α-olefin random copolymer (B) is adjusted so that it is 20 to 60% by weight based on the weight of the composition, by controlling the polymerization time and using a polymerization activity modifier such as carbon monoxide, hydrogen sulfide or the like. The molecular weight of the propylene-α-olefin random copolymer (B) is adjusted so that the intrinsic viscosity $[\eta]_B$ of the propylene-α-olefin random copolymer (B) is preferably 0.5 to 2.0 dl/g, by using a molecular weight modifier such as hydrogen upon the polymerization of the copolymer (B).

The polymerization process may be any of batch, semi-continuous and continuous processes, but a continuous polymerization is industrially preferable.

After the completion of the second polymerization step, any residual monomer can be removed from the polymerization system to prepare a particulate polymer. The resultant polymer is subjected to the measurement of the intrinsic viscosity ($[\eta]_{WHOLE}$) and the content of α-olefin.

The propylene resin compositions of the present invention can be used as raw materials for shaped articles having various shapes formed by a variety of shaping methods such as injection, extrusion, inflation, calendaring or the like. In molding, the propylene resin composition may be blended, if necessary, with inorganic fillers such as talc, calcium carbonate, silica and mica, and organic and inorganic pigments which are used in conventional polyolefins. Further, known additives can be added, if necessary, such as antioxidants, neutralizers, weathering agents, antistatic agents, lubricants, foaming agents, flame retardants and transparent nucleating agents.

EXAMPLES

The invention is further illustrated by the following examples and comparative examples, but not limited thereto.

1) Method for the Measurement of Various Physical Properties

The methods for the measurement of physical properties used in the Examples and Comparative Examples are mentioned below.

a) tan δ δ and E': They were measured at a frequency of 110 Hz and a temperature rise rate of 2° C./min., using an automatic measuring device for dynamic viscoelasticity (trade name: REO VIBRON DDV-III-EP, manufactured by ORIENTEC Co. Ltd.). For the measurement, a plate-like 27×10×1 mm test piece was used, which was prepared by melt pressing the propylene resin composition at 200° C.

b) Intrinsic viscosity (dl/g): It was measured in tetralin (tetrahydronaphthalene) solvent, at a temperature of 135° C., using an automatic viscometer (trade name: AVS2-type, manufactured by MITSUI TOATSU, Co., Ltd.).

c) Particle size (μm) and degree of uniformity of catalyst component for polyolefin manufacture: The average particle size was determined from a particle size distribution measured using "Master Sizer" (trade name, manufactured by MALVERN Co. Ltd.). The degree of uniformity was obtained by dividing a particle size equivalent to a screen opening where the integrated amount of a sample fallen from a screen opening reached 10% of all samples when the screen opening is gradually shifted from a small screen opening to a large screen opening, by a particle size equivalent to a screen opening where the above amount reached 60% of all samples.

d) Content of α-Olefin unit (weight %): It was measured by Infrared absorption spectroscopy.

e) Melting point: It was measured at a temperature rise rate of 20° C./min., using a differential scanning calorimeter (trade name: DSC Dupont 1090, manufactured by Du Pont Company).

2) Preparation of Catalyst Component for Polyolefin Manufacture a) Catalyst Component for Polyolefin Manufacture (A-1)

95.3 g of anhydrous $MgCl_2$ and 352 ml of dry EtOH were charged in a SUS autoclave purged with nitrogen, and the mixture was heated to 105° C. with stirring; and the mixture was melted. After stirring for one hour, the resulting liquid was fed into a two-way spray nozzle with pressurized nitrogen (1.1 MPa) heated at 105° C. The flow rate of nitrogen gas was 38 liter/min. Liquid nitrogen was introduced into a spray tower for cooling the tower, i.e, to keep the temperature in the tower at −15° C. 265 g of the product was collected in cooled hexane introduced at the bottom of the tower. According to the analysis of the product, the composition of this product was found to be $MgCl_2 \square 6EtOH$ identical with the starting solution.

This product was sieved to obtain 205 g of a spherical product having a particle size of 45–212 μm. The resultant spherical product was dried at room temperature for 181 hrs., using nitrogen at the flow rate of 3 liters/min, to prepare a dry product with the composition of $MgCl_2 \square 1.7\ EtOH$. This product was used as a carrier.

In a glass flask purged with nitrogen, 20 g of the dry carrier, 160 ml of titanium tetrachloride and 240 ml of purified 1,2-dichloroethane were mixed and heated to 100° C. with stirring, 6.8 ml of diisobutyl phthalate were added, and the mixture was further heated at 100° C. for 2 hrs. A liquid phase part was removed by decantation, washed with purified hexane and then dried to prepare a catalyst component for polyolefin manufacture (A-1). The resultant catalyst component for polyolefin manufacture (A-1) had the average particle size of 115 μm and the degree of uniformity of 1.80, with the analysis of the following composition: Mg: 19.5% by weight, Ti: 1.6% by weight, Cl: 59.0% by weight.

b) Catalyst Component for Polyolefin Manufacture (A-2)

60 ml of titanium tetrachloride and 40 ml of toluene were charged in a glass flask purged with nitrogen to prepare a mixed solution. A suspension prepared from 20 g of magnesium diethoxide having an average particle size of 42 μm, 100 ml of toluene and 7.2 ml of di-n-butyl phthalate was added to the mixed solution kept at 10° C. Subsequently, the temperature of the resulting mixture was elevated from 10° C. to 90° C. over a period of 80 minutes and the mixture was stirred for 2 hrs to allow the reaction to proceed. After completion of the reaction, the resulting solid product was washed four times with 200 ml of toluene at 90° C., and 60 ml of additional titanium tetrachloride and 140 ml of toluene were added. The temperature of the mixture was elevated to 112° C. and the mixture was stirred for another 2 hrs to allow the reaction to proceed. After completion of the reaction, the resultant solid product was washed 10 times with 200 ml of n-heptane at 40° C. to prepare a catalyst component for polyolefin manufacture (A-2). The resultant catalyst component for polyolefin manufacture (A-2) had the average particle size of 42 μm and the degree of uniformity of 2.00, with the analysis of the following composition: Mg: 18.9% by weight, Ti: 2.2% by weight, Cl: 61.6% by weight.

c) Catalyst Component for Polyolefin Manufacture (A-3)

A mixture of 300 g of magnesium ethoxide, 550 ml of 2-ethylhexyl alcohol and 600 ml of toluene was stirred at 93°

C. for 3 hrs under a carbon dioxide atmosphere of 0.20 MPa, and further 800 ml of toluene and 800 ml of n-decane were added to prepare a magnesium carbonate solution.

100 ml of the magnesium carbonate solution as prepared above were added to a mixed solution stirred at 30° C. for 5 minutes, comprising 800 ml of toluene, 60 ml of chlorobenzene, 18 ml of tetraethoxysilane, 17 ml of titanium tetrachloride and 200 ml of "Isopar G" (trade name, manufactured by EXXSON Co. Ltd.) (isoparaffin hydrocarbon with 10 average carbon numbers, b.p. 56–176° C.).

After stirring for additional 5 minutes, 44 ml of tetrahydrofuran were added, and the mixture was stirred at 66° C. for one hour. After the stirring was ceased and the supernatant solution was removed, the resulting solid was washed with 100 ml of toluene, 200 ml of chlorobenzene and 200 ml of titanium tetrachloride were added to the resultant solid, and a mixture was stirred at 135° C. for one hour. After stirring was ceased and the supernatant solution was removed, 500 ml of chlorobenzene, 200 ml of titanium tetrachloride and 4.2 ml of di-n-butyl phthalate were added, and the mixture was mixed at 135° C. for 1.5 hrs. After the supernatant solution was removed, the solid was washed with successive, 1200 ml of toluene, 1600 ml of "Isopar G" and 800 ml of hexane to prepare a catalyst component (A-3) for polyolefin manufacture in Comparative Example. The resultant catalyst component for polyolefin manufacture (A-3) had the average particle size of 24 μm and the degree of uniformity of 1.64, with the analysis of the following composition: Mg: 17.0% by weight, Ti: 2.3% by weight, Cl: 55.0% by weight.

Example 1

3) Pre-activation of Catalyst Component for Polyolefin Manufacture

A stainless steel reaction vessel having an internal volume of 20 liters equipped with slant vanes was purged with nitrogen gas and then charged at room temperature with 18 liter of a saturated hydrocarbon solvent having a dynamic viscosity of 70 centistokes at 40° C. (trade name: CRYSTOL-352, manufactured by ESSO Petroleum Co. Ltd.), 1.8 liter of hexane, 100.6 mmol of triethyl aluminum, 15.1 mmol of di-isopropyl-di-methoxysilane and 120.4 g of the catalyst component (A-1) for polyolefin manufacture as prepared above, and the mixture was warmed to 30° C. Subsequently, the catalyst was pre-activated by feeding 240.8 g of propylene while stirring over a period of 3 hrs. The result of the analysis indicated that 1.9 g of propylene was reacted per 1 g of the catalyst component for polyolefin manufacture.

4) First Polymerization Step

In the flow sheet shown in FIG. 1, 0.4 g/hr of the pre-activated catalyst, triethyl aluminum as an organoaluminum compound and di-isopropyl-di-methoxysilane as an organosilicon compound were continuously fed to a horizontal type polymerization reactor equipped with stirring vanes (L/D=6, internal volume 100 lit.), under such a condition that an Al/Si molar ratio was 6. A mixed gas of propylene and ethylene in the indicated molar ratio as shown in Table 1 was continuously fed, while maintaining the conditions including the reaction temperature of 60° C., the reaction pressure of 2.1 MPa and the stirring speed of 35 rpm. Further, hydrogen gas was continuously fed through piping 2 so that the hydrogen concentration in the vapor phase within the polymerization reactor was kept at the hydrogen/propylene molar ratio shown in Table 1, to produce the propylene-α-olefin copolymer (A).

The reaction heat was removed as heat of vaporization of a raw material, propylene fed through piping 3. Unreacted gas discharged from the polymerization reactor was cooled and condensed outside the reaction system via piping 4 and returned to polymerization reactor 1.

The resultant propylene-α-olefin random copolymer (A) was continuously taken out from the polymerization reactor 1 via piping 5 so that the polymer occupied 50% by volume of the reactor, and then it was fed to a polymerization reactor 10 in the second polymerization step. At this time, a part of the propylene-α-olefin random copolymer (A) was intermittently taken out from piping 5 and it was used as a sample for measuring the ethylene content and intrinsic viscosity.

5) Second Polymerization Step

The propylene-α-olefin random copolymer (A) from the first polymerization step and a mixed gas of ethylene and propylene were continuously fed to a horizontal type polymerization reactor 10 equipped with stirring vanes (L/D=6, internal volume 100 lit.) to carry out a copolymerization of ethylene and propylene. The reaction conditions include the stirring speed of 25 rpm, the temperature of 55° C. and the pressure of 1.9 MPa. The gas composition in the vapor phase was controlled to give the ethylene/propylene molar ratio and the hydrogen/ethylene molar ratio shown in Table 1. Through piping 11, carbon monoxide was supplied as a polymerization inhibitor to control the amount of the propylene-α-olefin random copolymer (B) polymerized, and through piping 7 hydrogen gas was supplied to control the molecular weight of the propylene-α-olefin random copolymer (B).

The reaction heat was removed by heat of vaporization of a raw material, liquid propylene supplied from piping 6. Unreacted gas discharged from the polymerization reactor was transferred to the outside of the reaction system via piping 8, cooled, condensed and then returned to the second polymerization step. The propylene resin composition produced in the second polymerization step was continuously taken out from polymerization reactor 10 via piping 9 so that the level of the polymer retained is 50% by volume of the reaction volume. The production rate of the propylene resin composition was 8 to 15 kg/hr.

Figure 2:
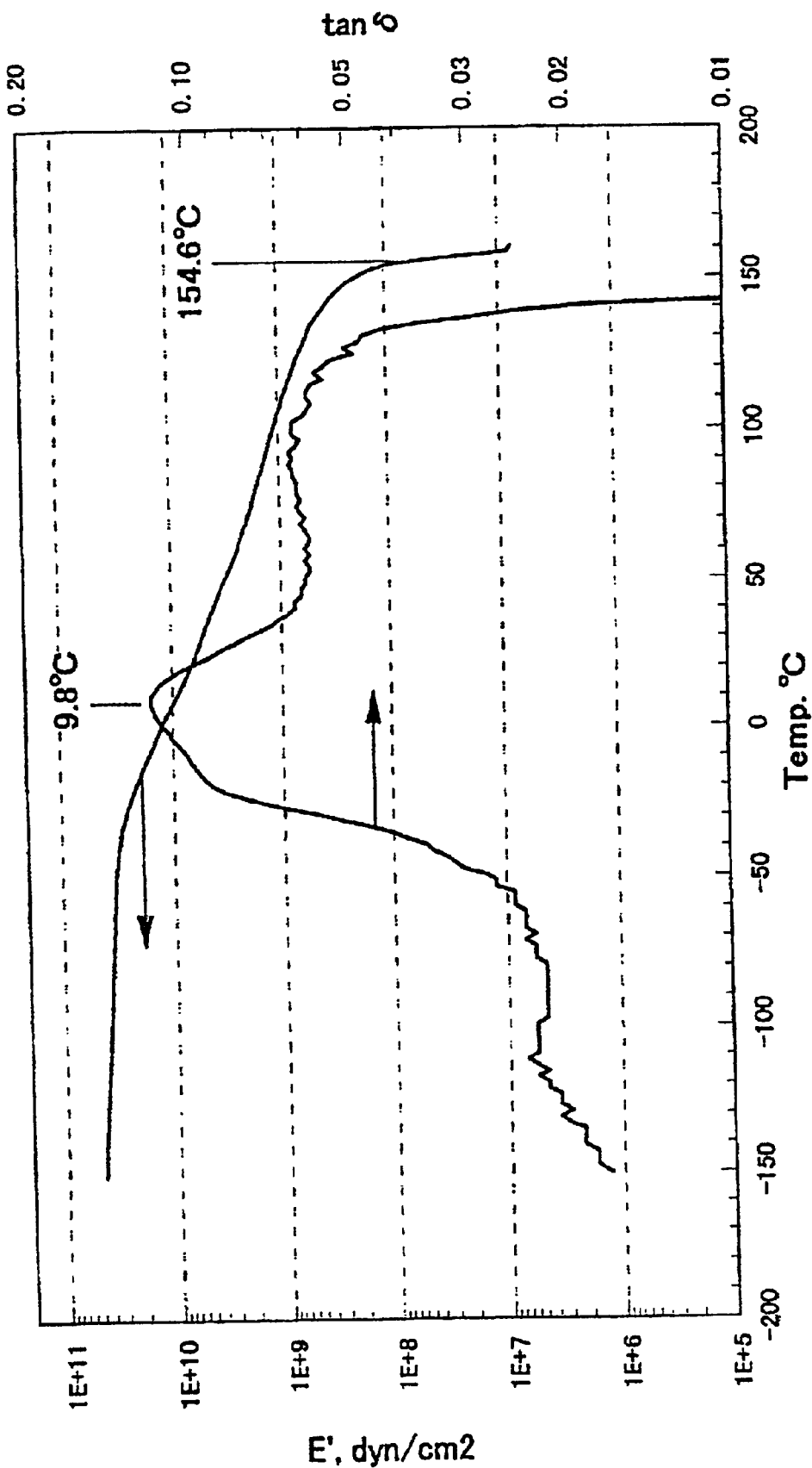
FIG. 2 is a chart of storage elastic modulus (E') and loss tangent (tan δ) measured, relating to Example 1.

For the propylene-α-olefin random copolymer (A) produced in the first step and the polypropylene composition produced in the second step, various physical properties were measured. The intrinsic viscosity $[\eta]_B$ of the propylene-α-olefin random copolymer (B) was calculated on the basis of the above-mentioned equation, using the intrinsic viscosity $[\eta]_A$ of the propylene-α-olefin random copolymer (A) and the intrinsic viscosity $[\eta]_{WHOLE}$ of the propylene resin composition. The result of various physical properties measured is shown in Table 1. The chart of storage elastic modulus (E') and loss tangent (tan δ) measured is shown in FIG. 2.

Examples 2–5, Comparative Examples 1–4

The above-mentioned catalyst component for polyolefin manufacture (A-2) was used as a catalyst component. The compositions of Examples 2–5 and Comparative Examples 1–4 were produced by varying the ethylene/propylene molar ratio and the hydrogen/propylene molar ratio in the first polymerization step as well as the ethylene/propylene molar ratio and the hydrogen/ethylene molar ratio in the second polymerization step as shown in Tables 1 and 2.

Figure 3:
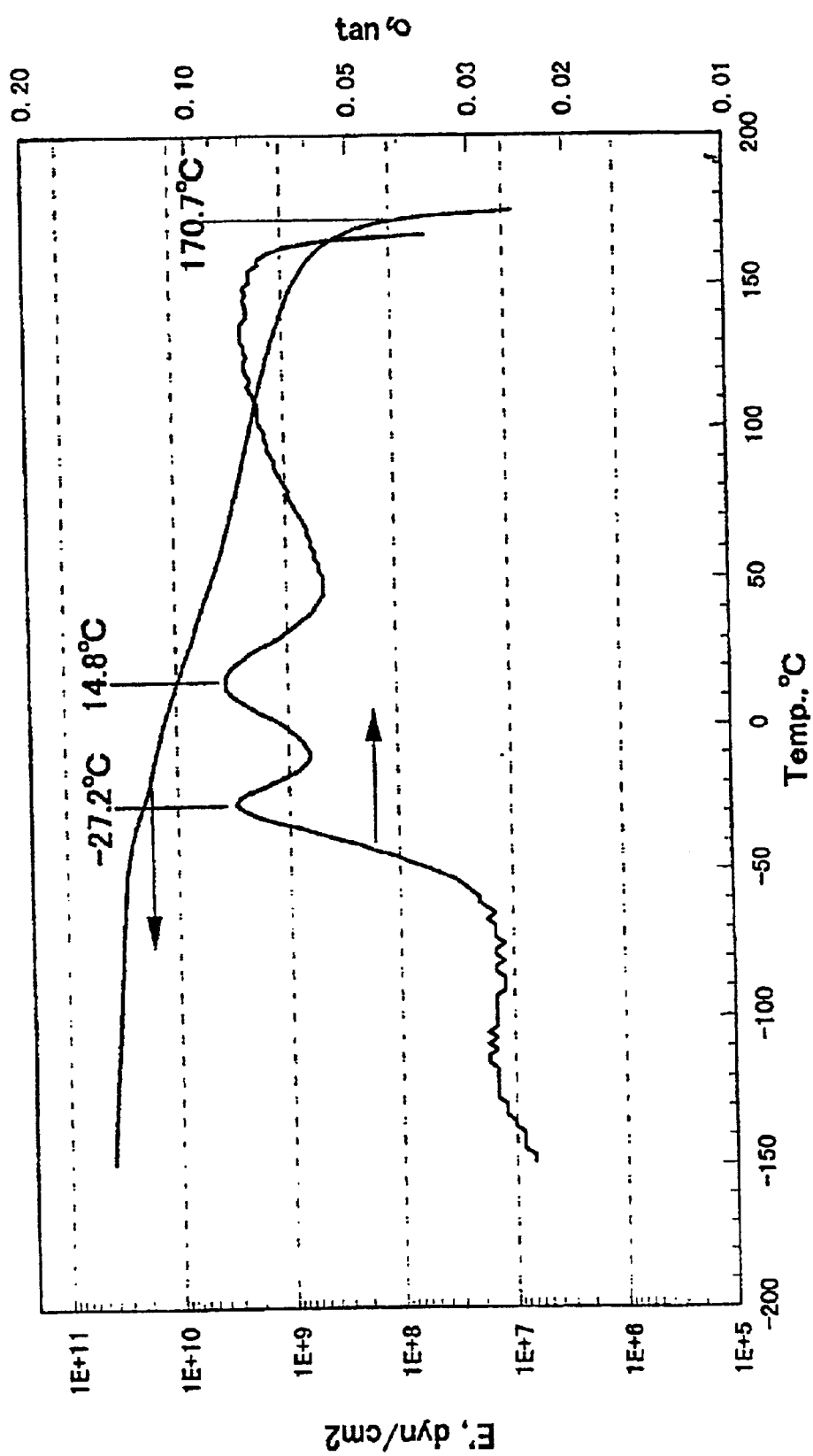
FIG. 3 is a determined chart of storage elastic modulus (E') and loss tangent (tan δ) relating to Comparative Example 2.

The results of various physical properties measured for the resultant compositions are shown in Tables 1 and 2. For Comparative Example 2, the chart of storage elastic modulus (E') and loss tangent (tan δ) measured is shown in FIG. 3.

Comparative Example 5

The above-mentioned catalyst component for polyolefin manufacture (A-3) was used as a catalyst component. The composition of Comparative Example 5 was produced by varying the ethylene/propylene molar ratio and the hydrogen/propylene molar ratio in the first polymerization step as well as the ethylene/propylene molar ratio and the hydrogen/ethylene molar ratio in the second polymerization step as shown in Table 2.

The result of various physical properties measured for the resultant composition is shown in Table 2.

6) Production of Injection Molded Articles 0.004 kg of a phenol type heat stabilizer and 0.004 kg of calcium stearate were added to 4 kg of each composition produced in each Example and Comparative Example, and they were mixed at room temperature for 2 minutes using a high speed stirring mixer (trade name: Henschel mixer). The mixture was granulated into pellets in an extruding granulator with a screw diameter of 40 mm. Then, a JIS type test piece was prepared from the pellets using an injection molding machine at the molten resin temperature of 250° C. and the mold temperature of 50° C. The resulting test piece was conditioned in a chamber kept at 50% humidity and at a temperature of 23° C. for 72 hours, and various physical properties thereof were measured according to the following methods. The results are shown in Tables 1 and 2.

a) Flexural modulus (MPa): It was measured in accordance with JIS K 7203.
b) Haze: It was measured in accordance with ASTM D 1003 using a plate-like 25×50×1 mm test piece conditioned under the above condition.
c) Izod impact value: It was measured in accordance with JIS K 6758 at each temperature of 0° C. and −20° C.
d) Whitening by impact: A load was fallen, under the following conditions, on a plate-like 50×50×2 mm test piece conditioned under the above conditions, using a du Pont impact machine (manufactured by Toyo Seiki Co., Ltd.), and a diameter of whitening area generated on the test piece by impact was measured.

| Tip radius in impact core | 0.635 cm |
|---|---|
| Inner diameter of anvil | 3.81 cm |
| Load | 500 g |
| Falling height of load | 1 m |

TABLE 1

| | Example | | | | |
|---|---|---|---|---|---|
| | 1 | 2 | 3 | 4 | 5 |
| First polymerization step | | | | | |
| Polymerization pressure MPa | 2 | → | → | → | → |
| Polymerization temperature ° C. | 60 | → | → | → | → |
| α-Olefin component | ethylene | → | → | → | → |
| Hydrogen/propylene (molar ratio) | 0.004 | 0.006 | 0.005 | 0.004 | 0.005 |

TABLE 1-continued

| | Example | | | | |
|---|---|---|---|---|---|
| | 1 | 2 | 3 | 4 | 5 |
| Ethylene/propylene (molar ratio) | 0.007 | 0.007 | 0.006 | 0.002 | 0.003 |
| Copolymer (A) | | | | | |
| Produced amount $W_A$ wt % | 67 | 73 | 60 | 56 | 75 |
| Propylene unit content wt % | 99.1 | 99.1 | 99.2 | 99.7 | 99.6 |
| Second polymerization step | | | | | |
| Polymerization pressure MPa | 1.9 | → | → | → | → |
| Polymerization temperature ° C. | 55 | → | → | → | → |
| α-Olefin component | Ethylene | → | → | → | → |
| Ethylene/propylene (molar ratio) | 0.14 | 0.13 | 0.11 | 0.11 | 0.13 |
| Hydrogen/ethylene (molar ratio) | 0.52 | 0.45 | 0.60 | 0.62 | 0.52 |
| Copolymer (B) | | | | | |
| Produced amount $W_B$ wt % | 33 | 27 | 40 | 44 | 25 |
| Propylene unit content wt % | 75 | 77 | 78 | 78 | 77 |
| Intrinsic viscosity $[\eta]_B$ | 1.76 | 1.93 | 1.66 | 1.59 | 1.61 |
| Propylene resin composition | | | | | |
| Number of tan δ peak in the range of −80–80° C. | 1 | 1 | 1 | 1 | 1 |
| Temperature at which E' is 1 × 10$^8$ or less ° C. | 154.6 | 153.7 | 154.7 | 163.5 | 163.1 |
| Intrinsic viscosity $[\eta]_{WHOLE}$ | 1.76 | 1.93 | 1.66 | 1.59 | 1.61 |
| Physical properties of shaped article | | | | | |
| Flexural modulus MPa | 350 | 570 | 450 | 380 | 590 |
| Haze % | 31 | 39 | 32 | 38 | 39 |
| Izod impact value (0° C.) kJ/m$^2$ | NB*[1] | 14.1 | NB*[1] | NB*[1] | 12.4 |
| (−20° C.) | 16 | 10 | 18 | 14 | 8 |
| Diameter of whitening by impact mm | 0 | 3.2 | 0 | 0 | 3.5 |
| Melting point ° C. | 156 | 156 | 157 | 161 | 161 |

*[1]: Not destructed

TABLE 2

| | Comparative Example | | | | |
|---|---|---|---|---|---|
| | 1 | 2 | 3 | 4 | 5 |
| First polymerization step | | | | | |
| Polymerization pressure MPa | 2 | → | → | → | → |
| Polymerization temperature ° C. | 60 | → | → | → | → |
| α-Olefin component | — | — | ethylene | → | → |
| Hydrogen/propylene (molar ratio) | 0.0035 | 0.02 | 0.02 | 0.006 | 0.012 |
| Ethylene/propylene (molar ratio) | 0 | 0 | 0.002 | 0.006 | 0.029 |
| Copolymer (A) | | | | | |
| Produced amount $W_A$ wt % | 50 | 67 | 67 | 82 | 80 |

TABLE 2-continued

|  | Comparative Example | | | | |
|---|---|---|---|---|---|
|  | 1 | 2 | 3 | 4 | 5 |
| Propylene content wt % | 100 | 100 | 99.8 | 99.3 | 97.0 |
| Second polymerization step | | | | | |
| Polymerization pressure MPa | 1.9 | → | → | → | → |
| Polymerization temperature ° C. | 55 | → | → | → | → |
| α-Olefin component | Ethylene | → | → | → | → |
| Ethylene/propylene (molar ratio) | 0.23 | 0.26 | 0.26 | 0.14 | 0.14 |
| Hydrogen/ethylene (molar ratio) | 0.30 | 0.41 | 0.40 | 0.90 | 0.40 |
| Copolymer (B) | | | | | |
| Produced amount $W_B$ wt % | 50 | 33 | 33 | 18 | 20 |
| Propylene content wt % | 66 | 64 | 64 | 75 | 75 |
| Intrinsic viscosity $[\eta]_B$ | 2.59 | 2.02 | 2.16 | 1.54 | 2.17 |
| Propylene resin composition | | | | | |
| Number of tan δ peak in the range of -80–80° C. | 2 | 2 | 2 | 1 | 1 |
| Temperature at which E' is $1 \times 10^8$ or less ° C. | 164.7 | 170.7 | 168.7 | 154.9 | 143.7 |
| Intrinsic viscosity $[\eta]_{WHOLE}$ | 2.84 | 2.02 | 2.08 | 2.41 | 2.17 |
| Physical properties of shaped article | | | | | |
| Flexural modulus MPa | 300 | 570 | 560 | 740 | 510 |
| Haze % | 47 | 53 | 52 | 53 | 45 |
| Izod impact value (0° C.) kJ/m² | NB*1 | NB*1 | NB*1 | 6.5 | 10.6 |
| (-20° C.) | NB | 19 | 16 | 3.7 | 5.4 |
| Diameter of whitening by impact mm | 0 | 14.7 | 12.7 | 12.5 | 12.9 |
| Melting point ° C. | 165 | 165 | 162 | 158 | 145 |

*1: Not destructed

INDUSTRIAL UTILIZATION

The shaped articles produced from the propylene resin composition satisfying the requirements for physical properties in the present invention have excellent transparency, stress-whitening resistance, impact strength at low temperatures, and further heat resistance, and well-balanced properties thereof. The propylene resin composition of the present invention is used suitably in various applications for which such properties are required.

What is claimed is:

1. A propylene resin composition comprising 80 to 40% by weight of (A) a propylene-α-olefin random copolymer with the content of a propylene unit of 99.1 to 99.9% by weight, and 20 to 60% by weight of (B) a propylene-α-olefin random copolymer with the content of a propylene unit of 70 to 90% by weight, wherein the temperature dependence of dynamic viscoelasticity of the composition is such that the composition shows only one peak of loss tangent (tan δ) in the temperature range of −80° C. to 80° C., and the temperature at which storage elastic modulus (E') is $1 \times 10^8$ dyn/cm² or less is not less than 150° C.

2. The propylene resin composition of claim 1 wherein the temperature at which E' is $1 \times 10^8$ dyn/cm² or less is not less than 155° C.

3. The propylene resin composition of claim 1 wherein the intrinsic viscosity of the propylene-α-olefin random copolymer (B) is in the range of 0.5–2.0 dl/g.

* * * * *